(12) United States Patent
Misawa et al.

(10) Patent No.: US 12,058,491 B2
(45) Date of Patent: Aug. 6, 2024

(54) ELECTRONIC DEVICE

(71) Applicant: Sony Group Corporation, Tokyo (JP)

(72) Inventors: Yusuke Misawa, Tokyo (JP); Akito Hoshi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 466 days.

(21) Appl. No.: 17/414,320

(22) PCT Filed: Aug. 12, 2020

(86) PCT No.: PCT/JP2020/030733
§ 371 (c)(1),
(2) Date: Jun. 16, 2021

(87) PCT Pub. No.: WO2022/034663
PCT Pub. Date: Feb. 17, 2022

(65) Prior Publication Data
US 2022/0312109 A1    Sep. 29, 2022

(51) Int. Cl.
| | |
|---|---|
| *H04R 17/10* | (2006.01) |
| *B06B 1/06* | (2006.01) |
| *G06F 3/01* | (2006.01) |
| *H04R 1/28* | (2006.01) |
| *H04R 3/14* | (2006.01) |
| *H04R 17/00* | (2006.01) |

(52) U.S. Cl.
CPC .............. *H04R 1/2811* (2013.01); *B06B 1/06* (2013.01); *G06F 3/016* (2013.01); *H04R 3/14* (2013.01); *H04R 17/00* (2013.01); *H04R 2400/03* (2013.01); *H04R 2499/11* (2013.01); *H04R 2499/15* (2013.01)

(58) Field of Classification Search
CPC .......... H04R 1/02; H04R 1/2811; H04R 3/00; H04R 3/14; H04R 7/04; H04R 17/00; H04R 17/10; H04R 2400/03; H04R 2499/11; H04R 2499/15; G06F 3/016; G06F 3/041; B06B 1/06
See application file for complete search history.

(56) References Cited

U.S. PATENT DOCUMENTS

| | | | | |
|---|---|---|---|---|
| 10,149,052 B2 * | 12/2018 | Akasaka | ................ | G06F 3/016 |
| 11,228,842 B2 * | 1/2022 | Xiao | .................... | H04R 17/00 |
| 11,711,640 B2 * | 7/2023 | Kim | ...................... | H04R 17/10 |
| | | | | 381/333 |

(Continued)

FOREIGN PATENT DOCUMENTS

| | | | | |
|---|---|---|---|---|
| CN | 105452993 A | * | 3/2016 | ............. G06F 3/016 |
| JP | 2005-78403 A | | 3/2005 | |

(Continued)

*Primary Examiner* — Edgardo San Martin
(74) *Attorney, Agent, or Firm* — XSENSUS LLP

(57) ABSTRACT

An electronic device (1) includes a touch panel display (2), a speaker (3), and a piezo actuator (4). The speaker (3) outputs a sound based on a first sound signal corresponding to a range of a prescribed frequency or more. The piezo actuator (4) is provided on the touch panel display (2), and is deformed in response to at least one of a second sound signal corresponding to a range of less than the prescribed frequency and a control signal for haptics feedback based on a predetermined vibration pattern to vibrate the touch panel display (2).

18 Claims, 11 Drawing Sheets

(56) References Cited

U.S. PATENT DOCUMENTS

| | | | |
|---|---|---|---|
| 2006/0022958 A1* | 2/2006 | Shiga | G06F 3/0421 |
| | | | 345/173 |
| 2010/0141408 A1 | 6/2010 | Doy et al. | |
| 2011/0128245 A1* | 6/2011 | Andoh | H10N 30/857 |
| | | | 345/173 |
| 2014/0145836 A1 | 5/2014 | Tossavainen et al. | |
| 2014/0301596 A1* | 10/2014 | Wang | H04R 1/028 |
| | | | 381/388 |
| 2015/0010173 A1* | 1/2015 | Bernal Castillo | H04R 17/00 |
| | | | 381/162 |
| 2018/0198052 A1* | 7/2018 | Park | G06F 1/1637 |

FOREIGN PATENT DOCUMENTS

| | | | |
|---|---|---|---|
| JP | 2006-40005 A | | 2/2006 |
| JP | 2009-219068 A | | 9/2009 |
| JP | 2011146006 A | * | 7/2011 |
| JP | 2013-20467 A | | 1/2013 |
| JP | 2013008118 A | * | 1/2013 |
| JP | 2014007444 A | * | 1/2014 |
| JP | 2014-116939 A | | 6/2014 |
| WO | 2009/144964 A1 | | 12/2009 |
| WO | WO-2014057593 A1 * | 4/2014 | ............. G06F 3/016 |

* cited by examiner

ELECTRONIC DEVICE

CROSS-REFERENCE TO RELATED APPLICATION

The present application is based on PCT filing PCT/JP2020/030733, filed Aug. 12, 2020, the entire contents of which is incorporated herein by reference.

FIELD

The present disclosure relates to an electronic device.

BACKGROUND

In recent years, a portable electronic device such as a smartphone has been required to be mounted with a high density since the area of a display tends to be increased and the display region tends to be enlarged while the main body is thinned. For example, Patent Literature 1 proposes a technique of performing sound output using a diaphragm.

In some electronic devices such as smartphones, a vibration device that vibrates the electronic device in a plane direction is mounted. The vibration by the vibration device is used for event notification such as an incoming call, feedback performed in response to a user's touch operation, and the like.

CITATION LIST

Patent Literature

Patent Literature 1: JP 2009-219068 A

SUMMARY

Technical Problem

However, in the conventional electronic device, high-density mounting is required, and as a result, it is difficult to secure a sufficient space for a speaker mounted on the electronic device. Therefore, there is a problem that the sound volume is poor in a certain specific range, particularly in a low range.

In order to solve such a problem, for example, it is conceivable to attempt to output a certain specific range at a desired sound volume by sound output using the diaphragm described in Patent Literature 1. However, the technique described in Patent Literature 1 has a problem that sufficient vibration intensity cannot be secured as a vibration device because the vibration of the diaphragm is local.

Therefore, the present disclosure proposes an electronic device capable of achieving a desired sound volume in a specific range and securing a desired vibration intensity while meeting the demand for high-density mounting.

Solution to Problem

To solve the above problem, An electronic device according to an embodiment of the present disclosure includes: a touch panel display; a speaker that outputs a sound based on a first sound signal corresponding to a range of a prescribed frequency or more; and a piezo actuator that is provided on the touch panel display and that is deformed in response to at least one of a second sound signal corresponding to a range of less than the prescribed frequency and a control signal for haptics feedback based on a predetermined vibration pattern to vibrate the touch panel display.

DESCRIPTION OF EMBODIMENTS

Hereinafter, the embodiments of the present disclosure will be described in detail with reference to the drawings. As in smartphones, tablets, notebook personal computers, and the like, the embodiments of the present disclosure include a speaker, have an audio playback function, and can be applied to all electronic devices that require high-density mounting due to thinning and miniaturization.

In the following embodiments, the same parts are designated by the same numerals or references, so that duplicate description may be omitted. Further, in the present specification and drawings, a plurality of components having substantially the same functional configurations may be distinguished by adding different numerals or references after the same numerals or references.

Further, the present disclosure will be described in the following item order.

1. Overview of electronic device according to the embodiment of the present disclosure 2. Example of information processing of electronic device according to the embodiment of the present disclosure 3. Configuration example of electronic device according to the embodiment of the present disclosure 4. Example of processing procedure of electronic device according to the embodiment of the present disclosure 5. Others 5-1. Example of frequency characteristics of playback signal 5-2. Hardware configuration example 6. Conclusion

Figure 1:
FIG. 1 is a plan view illustrating an external appearance of an electronic device according to an embodiment of the present disclosure.
Figure 2:
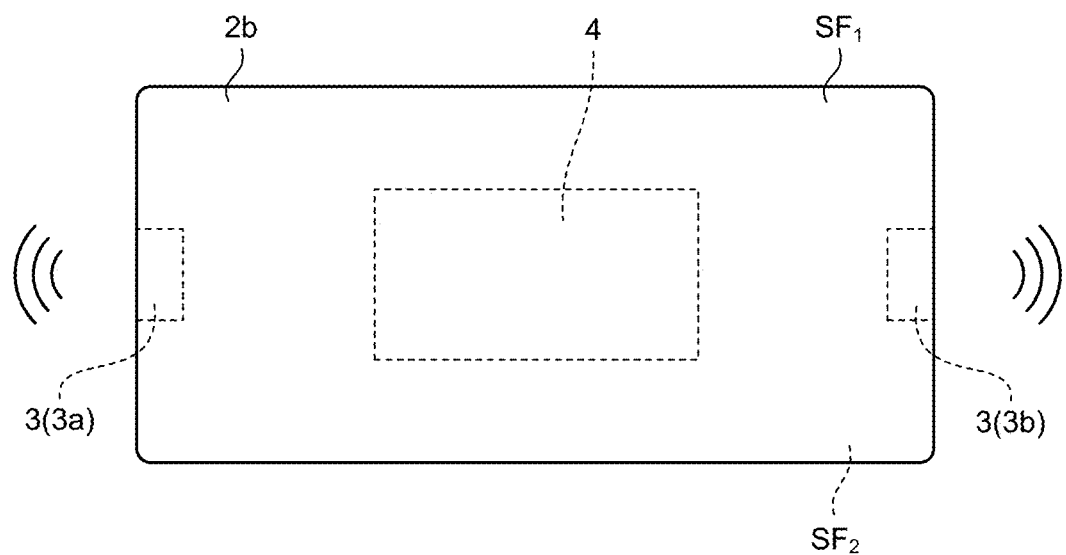
FIG. 2 is a plan view illustrating a positional relationship between a display and a piezo actuator included in the electronic device according to the embodiment of the present disclosure.

1. Overview of Electronic Device According to the Embodiment of the Present Disclosure Hereinafter, an overview of an electronic device according to the embodiment of the present disclosure will be described. FIG. 1 is a plan view illustrating an external appearance of an electronic device according to the embodiment of the present disclosure. FIG. 2 is a plan view illustrating a positional relationship between a display and a piezo actuator included in the electronic device according to the embodiment of the present disclosure.

As illustrated in FIG. 1, an electronic device 1 (as an example, a smartphone) according to the embodiment of the present disclosure includes a housing 1H having a substantially rectangular shape. As illustrated in FIGS. 1 and 2, the electronic device 1 includes a touch panel display 2, a speaker 3 (3a, 3b), and a piezo actuator 4.

The electronic device 1 includes the touch panel display 2 at the front (front face) of the housing 1H. The touch panel display 2 includes a touch panel 2a and a display 2b.

The touch panel 2a detects contact of a finger, a pen, a stylus pen, or the like with the touch panel 2a. The display 2b displays characters, images, symbols, figures, and the like. The display 2b has a front face $SF_1$ and a back face $SF_2$ facing the front face $SF_1$. The front face $SF_1$ of the display 2b corresponds to the display face of the display 2b, and is exposed toward the outside of the housing 1H, for example. The back face $SF_2$ of the display 2b is accommodated in the housing 1H without being exposed to the outside of the housing 1H. The display 2b functions as a vibrating body that vibrates by vibration.

The speaker 3 is, for example, a stereo speaker provided in the housing 1H to output a sound based on sound signals of various sound sources. The sound based on a first sound signal corresponding to a middle range and a high range extracted from sound signals of various sound sources is output. An example of the sound in the middle range and the high range includes a sound in a range of 800 Hz (hertz) or more.

The piezo actuator 4 is provided on the display 2b, which is a vibrating body, and is deformed in response to a second sound signal corresponding to the low range and a control signal for haptics feedback based on a predetermined vibration pattern to vibrate the display 2b. For example, the piezo actuator 4 is disposed so as to be deformed in the front and back direction of the housing 1H. The piezo actuator 4 causes the display 2b, which is a vibrating body, to function as an acoustic device that outputs a low range, and a vibration apparatus (haptics device) that feeds back tactile stimuli (such as a sense of striking) to the user's operation by vibration. As the low-range sound, for example, a sound in a range of less than 800 Hz (hertz) is exemplified.

As illustrated in FIG. 2, the piezo actuator 4 is provided at a position where the vibration of the display 2b is maximized (for example, near the center of the display 2b) by sticking or the like. As a result, the vibration generated by the deformation of the piezo actuator 4 is efficiently propagated to the display 2b.

Figure 3:
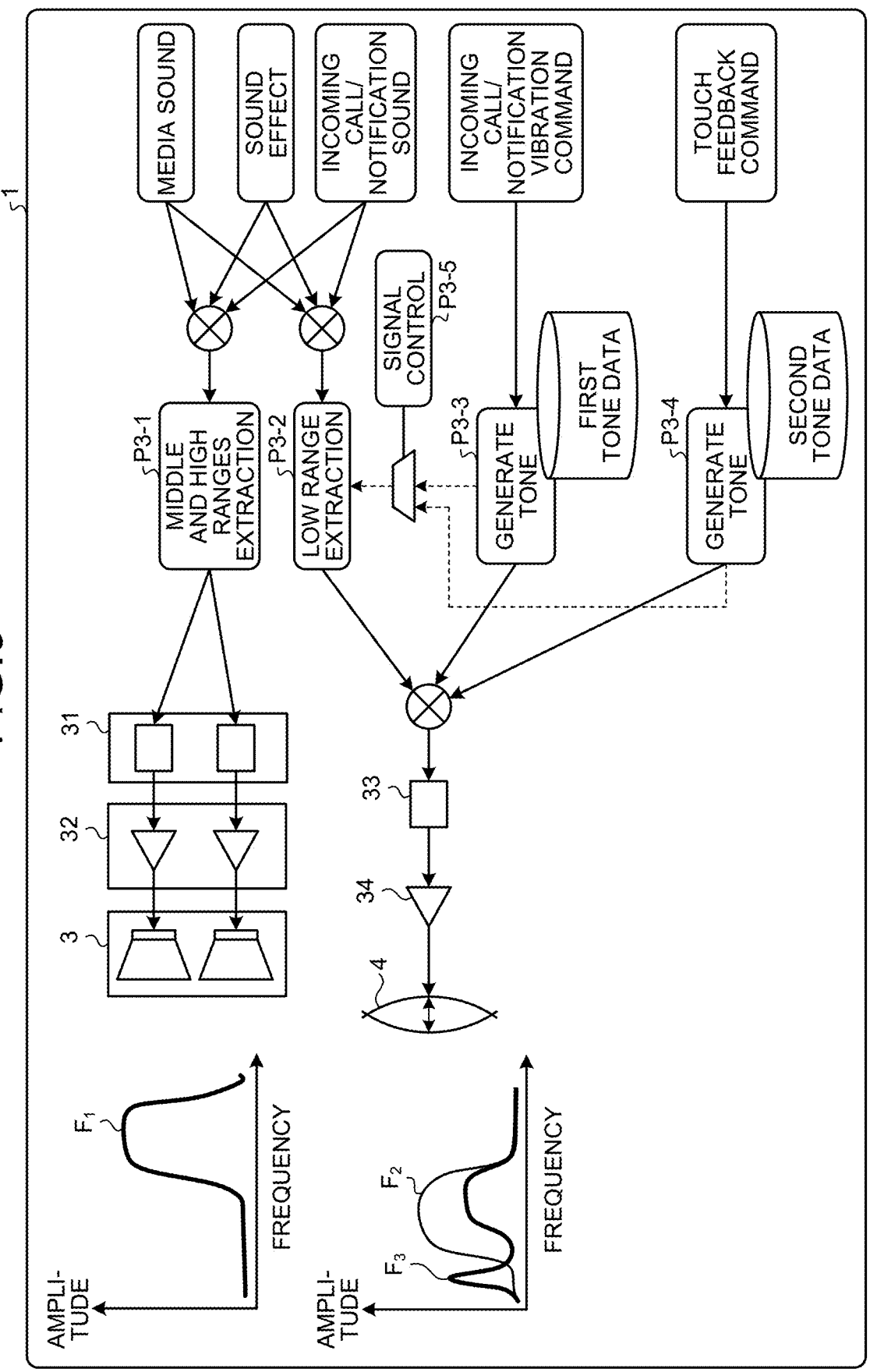
FIG. 3 is a diagram illustrating an example of information processing according to the embodiment of the present disclosure.
Figure 4:
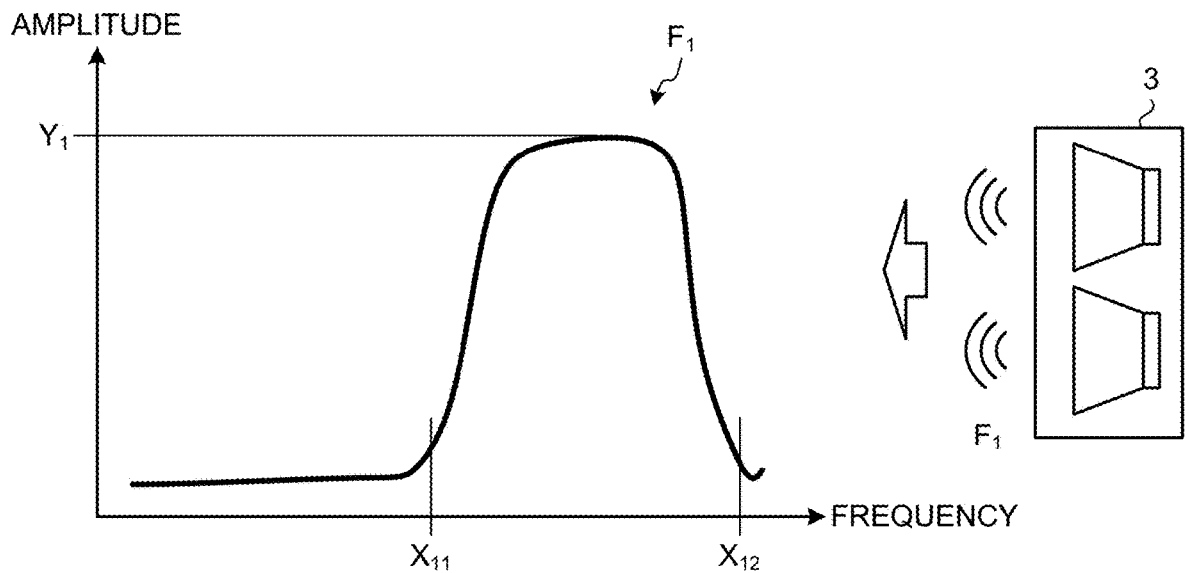
FIG. 4 is an enlarged view illustrating an example of frequency characteristics of output sound according to the embodiment of the present disclosure.
Figure 5:
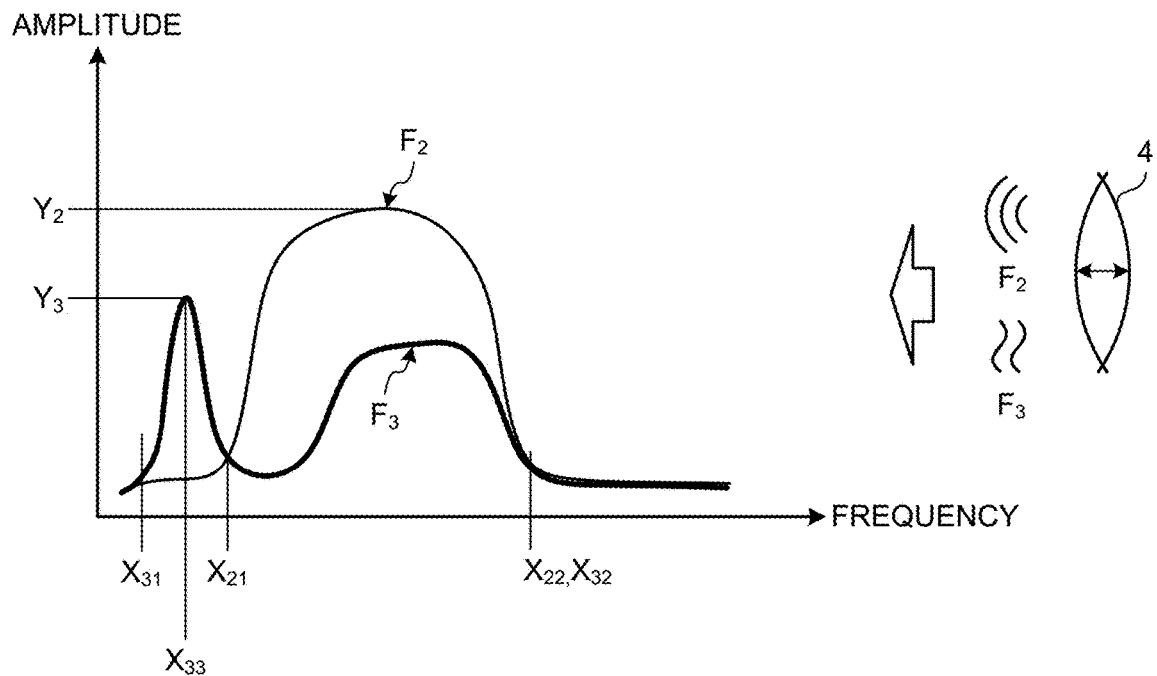
FIG. 5 is an enlarged view illustrating an example of frequency characteristics of output sound according to the embodiment of the present disclosure.
Figure 6:
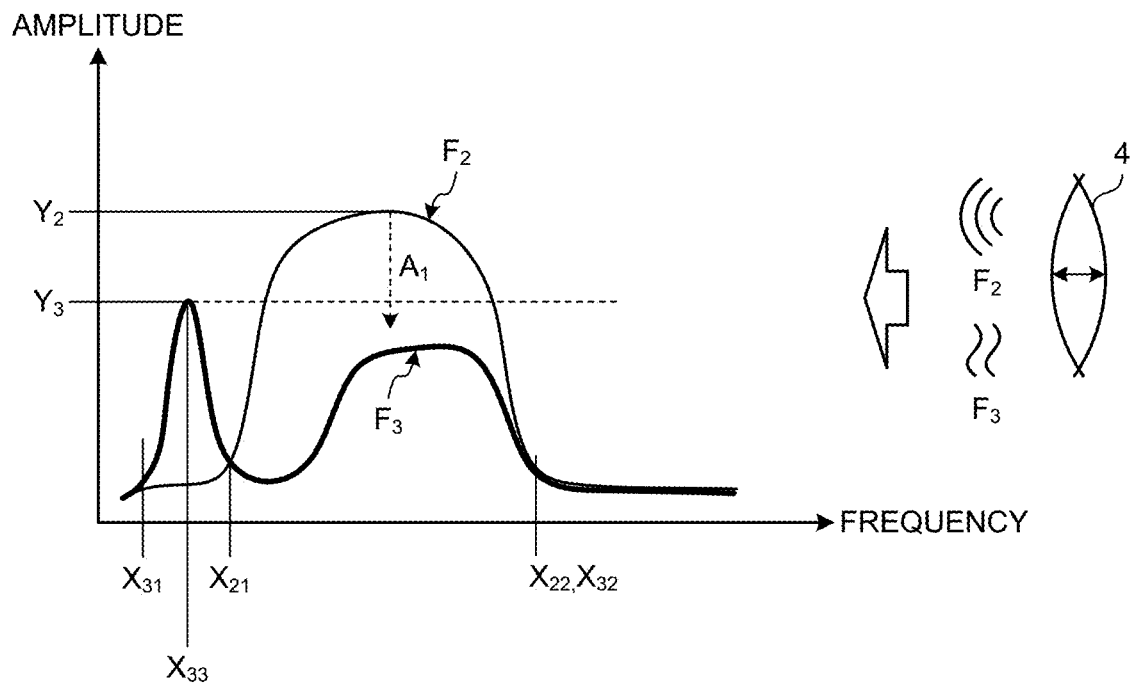
FIG. 6 is a diagram illustrating an example of signal control according to the embodiment of the present disclosure.
Figure 7:
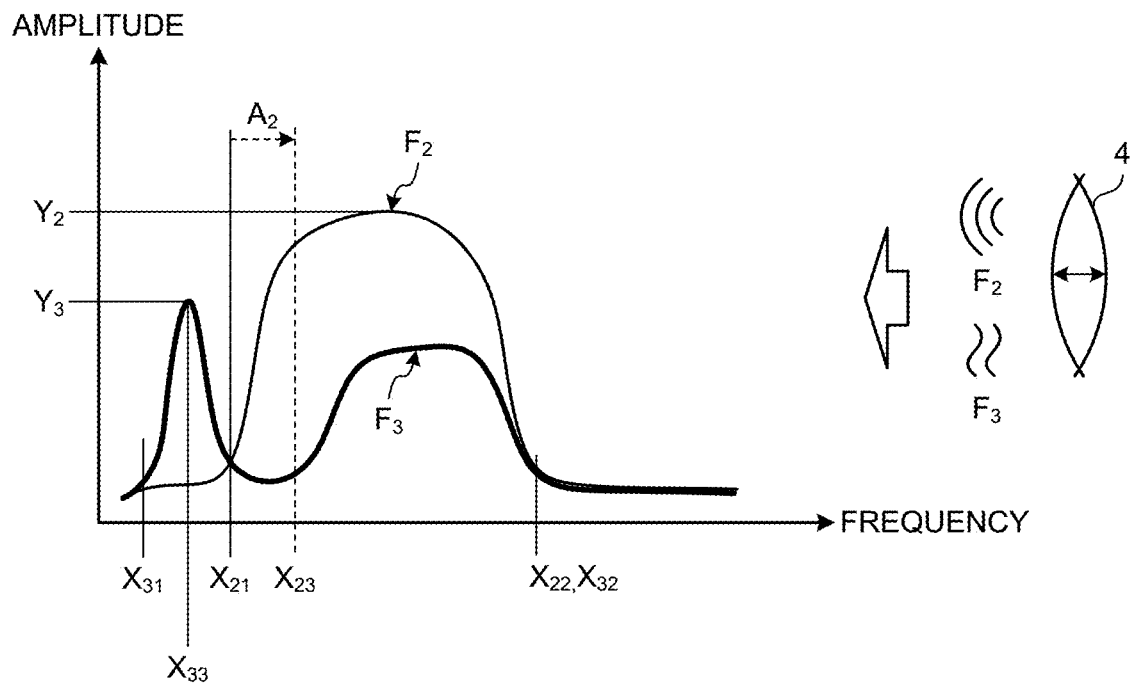
FIG. 7 is a diagram illustrating an example of signal control according to the embodiment of the present disclosure.

2. Example of Information Processing of Electronic Device According to the Embodiment of the Present Disclosure Hereinafter, an example of information processing of the electronic device according to the embodiment of the present disclosure will be described. FIG. 3 is a diagram illustrating an example of the information processing according to the embodiment of the present disclosure. FIGS. 4 and 5 are enlarged views illustrating an example of frequency characteristics of the output sound according to the embodiment of the present disclosure. FIGS. 6 and 7 are diagrams illustrating an example of signal control according to the embodiment of the present disclosure.

In an electronic device requiring high-density mounting, the size of a speaker also has to be reduced, and it is difficult to obtain a desired sound volume for a specific range (particularly, a low range). On the other hand, the display region of the display of the electronic device tends to be enlarged. Therefore, the electronic device 1 according to the embodiment of the present disclosure allocates the output of the sound in the middle and high ranges of a prescribed frequency or more to the speaker 3, and allocates the output of the sound in the low range below the prescribed frequency to the display 2b, which functions as an acoustic device. As a result, it is possible to obtain a desired sound volume for a specific range, that is, a low range, in which it is difficult to obtain a prescribed sound volume in an electronic device required to be mounted at a high density.

As illustrated in FIG. 3, the electronic device 1 extracts the first sound signal corresponding to the middle range and the high range (hereinafter referred to as "middle and high ranges") of a prescribed frequency or more from sound signals based on various sound sources such as a media sound, a sound effect signal, and an incoming call/notification sound (P3-1). For example, a range of 800 Hz (hertz) or more can be exemplified as the middle and high ranges of a prescribed frequency or more.

The media sound is audio of multimedia content such as music and moving images. The sound effect is a system sound played back in conjunction with an operation of a user of the electronic device 1. The incoming call/notification sound is a sound for notifying the user of an event such as an e-mail reception and an incoming call, an application push notification, and the like generated in the electronic device 1.

When extracting the first sound signal, the electronic device 1 according to the embodiment of the present disclosure cuts part of a range (a range of less than 800 Hz) that can be reproduced as an audible sound by the speaker 3. As a result, the range in which the output is allocated to the speaker 3 is adjusted to the high range in order to utilize the performance of the speaker 3 as much as possible. Note that part of the range cut from the range that can be played back by the speaker 3 is complemented by an output from the display 2b described later.

A curve $F_1$ illustrated in FIGS. 3 and 4 exemplifies frequency characteristics of the first sound signal (sound in the middle and high ranges output from the speaker 3). As illustrated in FIG. 4, most of the frequency components included in the first sound signal, including the peak frequency having the maximum amplitude "$Y_1$", fall within the range of frequency "$X_{11}$" to frequency "$X_{12}$". Among sound signals based on various sound sources such as a media sound, a sound effect signal, and an incoming call/notification sound, for example, a sound signal of 800 Hz or more is output from the speaker 3.

The extracted first sound signal is input to the speaker 3 through a prescribed conversion by a conversion unit 31 and a prescribed amplification by an amplification unit 32. The speaker 3 outputs a sound or the like based on the first sound signal corresponding to the middle and high ranges.

Further, the electronic device 1 extracts the second sound signal corresponding to a low range of less than the prescribed frequency from sound signals based on various sound sources such as a media sound, a sound effect signal, and an incoming call/notification sound (P3-2). As the low range of less than the prescribed frequency, a range of less than 800 Hz from a certain lower limit frequency can be exemplified.

The electronic device 1 adopts, as the lower limit of the low range (frequency "$X_{21}$" illustrated in FIG. 5), a frequency of which the user cannot hear a sound unless the user brings the head close to the display 2b among the audible sounds. The frequency that defines the lower limit of the low range can be adopted from the range of 100 to 200 Hz, for example. Note that vibration in this frequency band can be recognized by a tactile sense.

A curve $F_2$ illustrated in FIGS. 3 and 5 exemplifies frequency characteristics of the second sound signal (sound in low range). More specifically, the curve $F_2$ indicates the characteristics of the output signal when the second sound signal is output from an amplification unit 34. The sound in the low range output based on the second sound signal is reproduced by the vibration of the display 2b.

As illustrated in FIG. 5, most of the frequency components included in the second sound signal, including the peak frequency having the maximum amplitude "$Y_2$", fall within the range of frequency "$X_{21}$" to frequency "$X_{22}$". Note that the range from the frequency "$X_{21}$" to the frequency "$X_{22}$" is set to partially overlap the range from the frequency "$X_{11}$" to the frequency "$X_{12}$" of the middle and high ranges described above. As a result, it is possible to prevent the lack of the frequency components of the playback sound.

The extracted second sound signal is input to the piezo actuator 4 through prescribed conversion by a conversion unit 33 and prescribed amplification by the amplification unit 34. The piezo actuator 4 is deformed in response to the second sound signal corresponding to the low range and vibrates the display 2b. The display 2b vibrates according to deformation of the piezo actuator 4 to output a sound based on the second sound signal corresponding to a sound in the low range.

Furthermore, focusing on the fact that the display region of the display 2b tends to expand, the electronic device 1 according to the embodiment of the present disclosure uses the display 2b as a vibration apparatus (haptics device). This eliminates the need for a vibrator or the like conventionally used as a vibration device, and can meet the demand for high-density mounting. In addition, with the expansion of the display region of the display 2b, the electronic device 1 can increase the amplitude at the time of vibration, compared with the case where a conventional display is made to function as a vibration device, and can also secure a desired vibration intensity.

As illustrated in FIG. 3, the electronic device 1 generates a tone based on a predetermined vibration pattern according to an incoming call/notification vibration command (P3-3). Specifically, the electronic device 1 refers to first tone data to determine the vibration pattern of the display 2b, and inputs a control signal for haptics feedback based on the determined vibration pattern to the piezo actuator 4. The piezo actuator 4 is deformed in response to the input control signal for haptics feedback and vibrates the display 2b. The display 2b vibrates according to the vibration pattern, and reproduces a tone corresponding to the vibration pattern.

In addition, the electronic device 1 generates a tone based on a predetermined vibration pattern according to a touch feedback command (P3-4). As a result, the vibration for feeding back a tactile stimulus (such as a sense of striking) to the user's operation is generated from the display 2b. A specific content of the processing is similar to that in the case of tone generation based on the incoming call/notification vibration command.

A curve $F_3$ illustrated in FIGS. 3 and 5 exemplifies frequency characteristics of a composite signal obtained by combining the second sound signal with the control signal for haptics feedback for driving the piezo actuator 4. More specifically, the characteristics of the output signal when the composite signal obtained by combining the second sound signal with the control signal for haptics feedback is output from the amplification unit 34 are illustrated. As indicated by the curve $F_3$, the frequency characteristics of the composite signal are different from the frequency characteristics of the second sound signal.

Specifically, the composite signal has a peak frequency having the maximum amplitude "$Y_3$" in a low frequency band in which not many of the frequency components of the second sound signal are included. In the electronic device 1, the peak frequency of the composite signal is adjusted in advance so as to be lower than the lower limit (the frequency "$X_{21}$" illustrated in FIG. 5) of the frequency band including the frequency components of the second sound signal. For example, a range of 100 to 200 Hz is adopted as a frequency band (a range of frequency "$X_{31}$" to frequency "$X_{21}$") for adjusting the peak frequency of the composite signal. While it is difficult to hear the vibration of 100 to 200 Hz as a sound, it is possible to recognize vibration by touch. That is, the peak frequency of the composite signal is adjusted so as to be in a frequency band in which hearing as a sound is difficult but recognition by touch is easy. In the electronic device 1 for example, when 150 Hz is adopted as the lower limit of the frequency band including the frequency components of the second sound signal (sound in the low range), the peak frequency of the composite signal is adjusted in the range of 100 Hz or more and less than 150 Hz.

Also, the vibration reproduced by the display 2b based on the composite signal has a smaller amplitude in the frequency range "$X_{31}$" to frequency "$X_{32}$" than the vibration reproduced by the display 2b based on the second sound signal. That is, a sound in the low range when reproduced by the display 2b based on the composite signal is smaller than a sound in the low range when reproduced by the display 2b based on the second sound signal.

Further, when the electronic device 1 inputs the above-mentioned composite signal to the piezo actuator 4, the electronic device 1 performs signal control under which the second sound signal is modulated so that the vibration of the display 2b based on the control signal for haptics feedback is prioritized over the vibration of the display 2b based on the second sound signal (P3-5).

The signal control under which the second sound signal is modulated is performed by at least one of suppression of an output level of the second sound signal or band limitation of the second sound signal, as described below.

When suppressing the output level of the second sound signal, the electronic device 1 suppresses the output level of the second sound signal so that the amplitude of the second sound signal is smaller than the amplitude of the control signal for haptics feedback. Specifically, as illustrated by arrow $A_1$ in FIG. 6, the electronic device 1 suppresses the output level of the second sound signal so that the maximum amplitude "$Y_2$" of the curve $F_2$ corresponding to the second sound signal is smaller than the maximum amplitude "$Y_3$" of the curve $F_3$ corresponding to the control signal for haptics feedback.

In addition, in a case where the band of the second sound signal is limited, the electronic device 1 limits the band of the second sound signal so as to attenuate low frequencies of frequency components included in the second sound signal. Specifically, as indicated by arrow $A_2$ in FIG. 7, the electronic device 1 shifts the lower limit frequency "$X_{21}$" of the frequency band of the second sound signal to a higher frequency, so that the frequency band of the second sound signal is limited to the range of frequency "$X_{23}$" to frequency "$X_{24}$". In addition, electronic device 1 may perform both suppression of the output level of the second sound signal illustrated in FIG. 6 and band limitation of the second sound signal illustrated in FIG. 7.

As described above, the electronic device 1 according to the embodiment of the present disclosure allocates the output of the sound in the low range to the display 2b functioning as the acoustic device. As a result, it is possible to increase the sound volume of a specific range, that is, a low range, in which it is difficult to obtain a prescribed sound volume in an electronic device required to be mounted at a high density, and to obtain a desired sound volume.

In addition, the electronic device 1 according to the embodiment of the present disclosure uses the display 2b whose display region tends to expand as a vibration apparatus (haptics device). As a result, an existing vibration apparatus such as a vibrator is unnecessary, and a desired vibration intensity can be secured while meeting the demand for high-density mounting.

In this manner, the electronic device 1 according to the embodiment of the present disclosure can realize a desired sound volume in a specific range and secure a desired vibration intensity while meeting the demand for high-density mounting.

Further, when the electronic device 1 according to the embodiment of the present disclosure inputs the composite signal obtained by combining the second sound signal with the control signal for haptics feedback to the piezo actuator 4, the electronic device 1 modulates the second sound signal so that the vibration of the display 2b based on the control signal for haptics feedback is prioritized over the vibration of the display 2b based on the second sound signal. As a result, it is possible to prevent the output of tactile feedback and the like to the user due to vibration from being buried in the output of the sound in the low range, and the purpose of making the user clearly perceive the vibration of the display 2b and making the user strongly feel the vibration effect of haptics feedback can be achieved.

Figure 8:
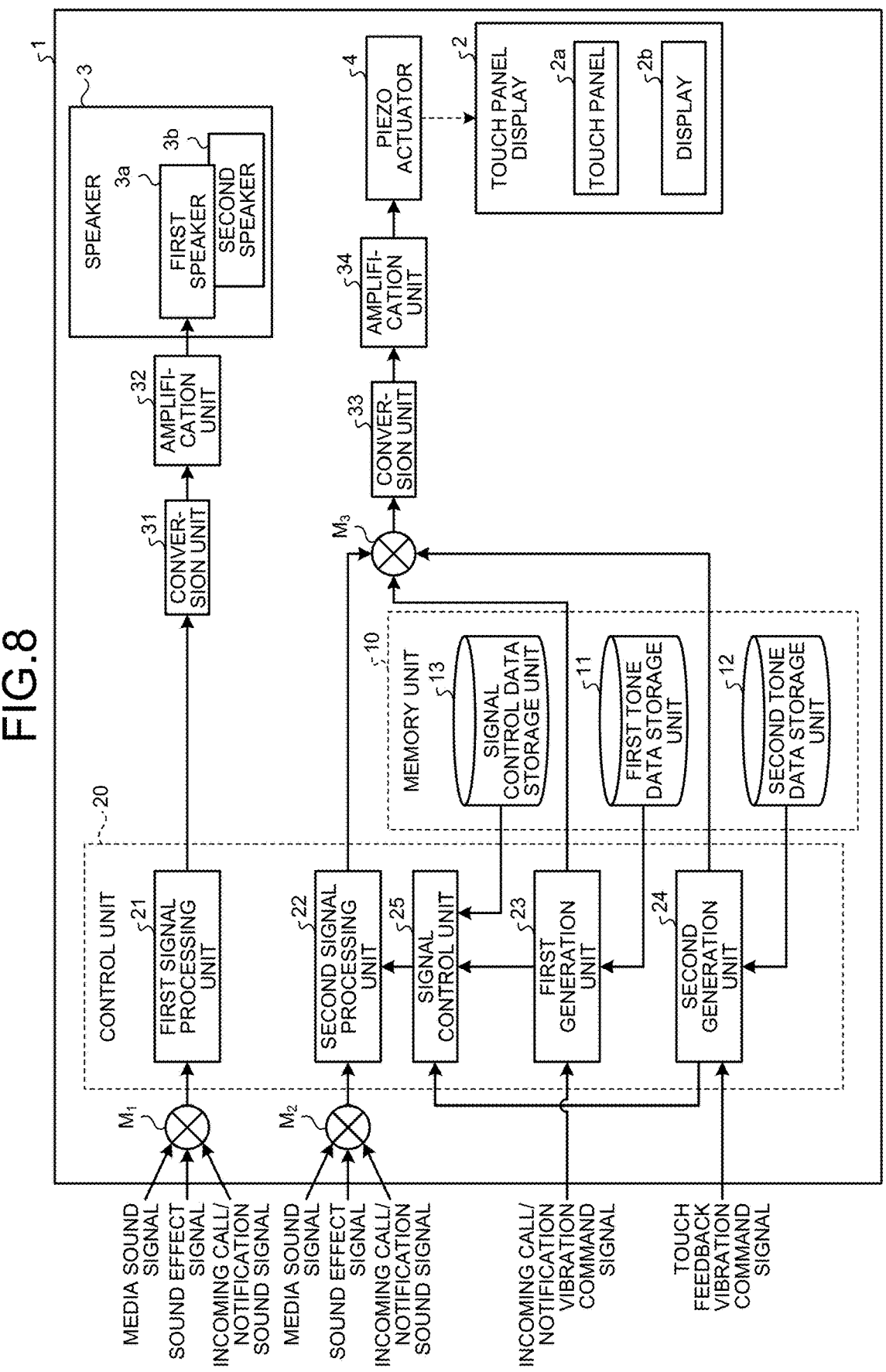
FIG. 8 is a block diagram illustrating an example of the functional configuration of the electronic device according to the embodiment of the present disclosure.

3. Configuration Example of Electronic Device According to the Embodiment of the Present Disclosure Hereinafter, a configuration example of an electronic device according to the embodiment of the present disclosure will be described. FIG. 8 is a block diagram illustrating an example of the functional configuration of the electronic device according to the embodiment of the present disclosure.

As illustrated in FIG. 8, the electronic device 1 includes the touch panel display 2, the speaker 3, the piezo actuator 4, a memory unit 10, a control unit 20, the conversion unit 31, the amplification unit 32, the conversion unit 33, and the amplification unit 34. The electronic device 1 realizes or executes the function and action of the electronic device 1 described below by these units.

The touch panel display 2 includes the touch panel 2a and the display 2b, and functions as an operation device that receives an operation by a user and a display device that displays various types of information and the like.

The touch panel 2a can detect a position where a finger, a pen, a stylus pen, or the like contacts the touch panel 2a. When the touch panel 2a detects contact with the touch panel 2a, the touch panel 2a notifies the control unit 20 of a contact detection position. The detection method of the touch panel 2a may be any method such as a capacitance method, a resistive film method, a surface acoustic wave method (or ultrasonic method), an infrared method, an electromagnetic induction method, and a load detection method.

The display 2b includes an organic or inorganic electroluminescence panel (EL panel) or the like, and displays characters, images, symbols, figures, various types of information, and the like. Note that the display 2b may be mounted on a display device other than the EL panel as long as the display 2b can vibrate. The piezo actuator 4 is provided on the back face $SF_2$ (see FIG. 2 and the like) of the display 2b by sticking or the like. The display 2b functions as a vibrating body that vibrates when the piezo actuator 4 vibrates.

The speaker 3 includes a first speaker 3a and a second speaker 3b to output a sound based on the first sound signal in a middle range and a high range extracted from sound signals of various sound sources.

The piezo actuator 4 is deformed according to the second sound signal corresponding to the low range and the predetermined control signal for haptics feedback to vibrate the display 2b. The piezo actuator 4 includes a piezoelectric element. The piezoelectric element included in the piezo actuator 4 is continuously deformed (expanded and contracted) in a planar direction by a prescribed signal (alternating signal or the like) over time. Continuous deformation of the piezoelectric element is propagated to the display 2b, thereby vibrating the display 2b. The piezo actuator 4 causes the display 2b, which is a vibrating body, to function as an acoustic device (woofer) that outputs a sound in the low range. In addition, the piezo actuator 4 causes the display 2b, which is a vibrating body, to function as a vibration apparatus (haptics device) that feeds back a tactile stimulus (such as a sense of striking) to the user's operation by vibration.

The piezo actuator 4 is provided on the back face $SF_2$ (see FIG. 2 and the like) of the display 2b by sticking or the like. The piezo actuator 4 is provided at a position where the vibration of the display 2b is maximized, for example, near the center of the back face $SF_2$ of the display 2b. In a case where the display 2b functions as an acoustic device (woofer), the piezo actuator 4 may be installed in consideration of the positional relationship with the speaker 3.

For example, the memory unit 10 is realized by a semiconductor memory device such as a random access memory (RAM) and a flash memory, or a memory device such as a hard disk and an optical disk. The memory unit 10 functions as a memory means for the control unit 20.

As illustrated in FIG. 8, the memory unit 10 includes a first tone data storage unit 11, a second tone data storage unit 12, and a signal control data storage unit 13.

The first tone data storage unit 11 stores data of a preset vibration pattern for reproducing the vibration based on the incoming call/notification vibration command. The vibration pattern data stored in the first tone data storage unit 11 is used in the process of generating a control signal for haptics feedback corresponding to the vibration pattern in a first generation unit 23, which will be described later. The vibration pattern for reproducing the vibration based on the incoming call/notification vibration command is pre-adjusted so that the frequency has a peak frequency between 100 to 200 Hz. The vibration pattern stored in the first tone data storage unit 11 has a vibration pattern different from that in the second tone data storage unit 12 described later.

The second tone data storage unit 12 stores data of a vibration pattern preset for reproducing the vibration based on the touch feedback command. The vibration pattern data stored in the second tone data storage unit 12 is used in the process of generating a control signal for haptics feedback corresponding to the vibration pattern in a second generation unit 24, which will be described later. The vibration pattern for reproducing the vibration based on the touch feedback command is pre-adjusted so that the frequency has a peak frequency between 100 to 200 Hz. The vibration pattern stored in the second tone data storage unit 12 has a vibration pattern different from that in the first tone data storage unit 11 described above.

The signal control data storage unit 13 stores signal control data that modulates the second sound signal input to the piezo actuator 4. The signal control data stored in the signal control data storage unit 13 is for example, an output level suppression threshold value for suppressing the output level of the second sound signal, or a band limitation threshold value for limiting the frequency band of the second sound signal. The signal control data stored in the signal control data storage unit 13 is used for signal control processing by a signal control unit 25 described later.

A mixing unit $M_1$ and a mixing unit $M_2$ are provided as different input systems. The mixing unit $M_1$ appropriately combines the sound signals based on various sound sources such as the media sound, the sound effect signal, and the incoming call/notification sound to transmit the combined sound signals to a first signal processing unit 21. Furthermore, the mixing unit $M_2$ appropriately combines the sound signals based on various sound sources such as the media sound, the sound effect signal, and the incoming call/notification sound to transmit the combined sound signals to a second signal processing unit 22. A mixing unit $M_3$ appropriately combines the second sound signal input from the second signal processing unit 22 with the control signal for haptics feedback input from the first generation unit 23 or the second generation unit 24 to transmit them to the conversion unit 33.

As illustrated in FIG. 8, the control unit 20 includes the first signal processing unit 21, the second signal processing unit 22, the first generation unit 23, the second generation unit 24, and the signal control unit 25. The control unit 20 realizes or executes the function and action of the electronic device 1 described below by these units.

Note that each block (first signal processing unit 21 to signal control unit 25) constituting the control unit 20 is a functional block indicating a function of electronic device 1. These functional blocks may be software blocks or hardware blocks. For example, each of the above functional blocks may be one software module realized by software (including a microprogram), or may be one circuit block on a semiconductor chip (die). Of course, each functional block may be one processor or one integrated circuit. The method of configuring the functional block is arbitrary. The electronic device 1 may be configured in a functional unit different from the above-mentioned functional block.

The first signal processing unit 21 extracts, from the input sound signal input from the mixing unit $M_1$, the first sound signal corresponding to the middle and high ranges of a prescribed frequency or more. For example, the first signal processing unit 21 cuts off the low frequency components from the input sound signal by the filtering process or the like using a high-pass filter or the like. As a result, the first signal processing unit 21 extracts the first sound signal corresponding to the middle and high ranges from the input sound signal. The first signal processing unit 21 transmits the extracted first sound signal to the conversion unit 31. An example of the middle and high ranges includes a range of 800 Hz (hertz) or more.

In the related art, among sound signals output from the speaker, the sound signal in the low range that cannot be sufficiently reproduced by the speaker and disappears as heat loss is cut. On the other hand, in the electronic device 1 according to the embodiment of the present disclosure, not only part, of the range, that disappears as heat loss, but also part, of the range, that can be played back is cut among the sound signals input to speaker 3, and are complemented by the display 2b to which the output in the low range is allocated. As a result, it is possible to sufficiently utilize the performance of the speaker 3 excellent in playback of a sound in the middle and high ranges, and it is possible to improve the sound volume and sound quality played back by the electronic device 1.

The second signal processing unit 22 extracts the second sound signal corresponding to the low range from the input sound signal input from the mixing unit $M_2$. For example, the second signal processing unit 22 cuts off high frequency components from the input sound signal by the filtering process or the like using a low-pass filter or the like. As a result, the second signal processing unit 22 extracts the second sound signal corresponding to the low range from the input sound signal. The second signal processing unit 22 transmits the extracted second sound signal to the conversion unit 33. An example of the low range includes a range of 200 Hz or more and less than 800 Hz. Note that the lower limit of the low range can be arbitrarily determined between 100 to 200 Hz.

Further, when the second signal processing unit 22 acquires the modulation command of the second sound signal from the signal control unit 25, the second signal processing unit 22 modulates the second sound signal based on this modulation command, and then transmits the modulated sound signal to the conversion unit 33. When the second signal processing unit 22 acquires a degree of suppression of the output level of the second sound signal as a modulation command, the second signal processing unit 22 suppresses, based on this degree, the output level of the second sound signal so that, for example, the amplitude of the second sound signal is smaller than the amplitude of the PCM sound signal. Further, when the second signal processing unit 22 acquires the limit degree of the band limitation of the second sound signal as a modulation command, the second signal processing unit 22 limits, based on this degree, the band of the second sound signal so that, for example, low frequencies of the frequency components included in the second sound signal are attenuated. The second signal processing unit 22 limits part of the band including the frequency components of the second sound signal by, for example, the filtering process or the like using a bandpass filter or the like.

The first generation unit 23 generates, based on the vibration pattern data stored in the first tone data storage unit 11, a pulse code modulation (PCM) sound signal (an example of a control signal for haptics feedback) that generates a tone based on an incoming call/notification vibration command on the display 2b. The first generation unit 23 transmits the generated PCM sound signal to the mixing unit $M_3$. In addition, when transmitting the generated PCM sound signal to the mixing unit $M_3$, the first generation unit 23 also transmits the PCM sound signal to the signal control unit 25.

The second generation unit 24 generates, based on the vibration pattern data stored in the second tone data storage unit 12, a PCM sound signal (an example of a control signal for haptics feedback) that generates a tone based on a touch feedback command on the display 2b. The second generation unit 24 transmits the generated PCM sound signal to the mixing unit $M_3$.

When the signal control unit 25 combines the second sound signal with the PCM sound signal to input them to the piezo actuator 4, the signal control unit 25 modulates the second sound signal so that the vibration of the display 2b in response to the PCM sound signal is prioritized over the vibration of the display 2b in response to the second sound signal.

Specifically, when the signal control unit 25 acquires the PCM sound signal from the first generation unit 23 or the second generation unit 24, the signal control unit 25 refers to the signal control threshold value stored in the signal control data storage unit 13 to determine the degree of suppression of the output level of the second sound signal. For example, as the degree of suppression of the second sound signal, at least the amplitude of the second sound signal is desirably smaller than the amplitude of the PCM sound signal. The signal control unit 25 transmits the modulation command indicating the determined degree of suppression of the second sound signal to the second signal processing unit 22.

In addition, the signal control unit 25 may limit the frequency band of the second sound signal so that the vibration of the display 2b according to the PCM sound signal is prioritized over the vibration of the display 2b according to the second sound signal. For example, the signal control unit 25 determines the degree of limitation of the frequency band of the second sound signal so as to attenuate at least part of the frequency components included in the second sound signal. The signal control unit 25 transmits the modulation command indicating the determined degree of limitation of the band limitation to the second signal processing unit 22. The signal control unit 25 may perform both suppression of the output level and band limitation of the second sound signal.

Note that the signal control unit 25 uses a method other than suppression of the output level of the second sound signal or band limitation of the second sound signal to perform control so that the PCM sound signal (an example of a control signal for haptics feedback) is prioritized over the second sound signal. Specifically, the electronic device 1 makes the playback time of the control signal for haptics feedback longer than the playback time of the second sound signal. This makes it possible to achieve the object of making the user strongly feel the vibration effect of haptics feedback.

Note that the range and sound volume that can be played back by the electronic device 1 change depending on the area, rigidity, and the like of the display 2b. In general, the larger the area of the display 2b and the lower the rigidity, the larger the amplitude due to the deformation of the installed piezo actuator 4, the wider the low range that can be played back by the electronic device 1, and the larger the sound volume. For this reason, the electronic device 1 may arbitrarily change the range of the low range and the range of vibration reproduced by the display 2b according to the area, rigidity, and the like of the display 2b.

The conversion unit 31 converts the first sound signal acquired from first signal processing unit 21 to transmit the converted first sound signal to the amplification unit 32. The amplification unit 32 amplifies the first sound signal acquired from conversion unit 31 to transmit the amplified first sound signal to the speaker 3. The conversion unit 31 can be realized by a digital analogue converter (DAC) or the like, and the amplification unit 32 can be realized by an amplifier or the like.

The conversion unit 33 converts the signal acquired from the mixing unit $M_3$ and transmits the converted signal to the amplification unit 34. The amplification unit 34 amplifies the signal acquired from the conversion unit 33 to transmit the amplified signal to the piezo actuator 4. A signal transmitted from the amplification unit 34 to the piezo actuator 4 is assumed to be a second sound signal, a PCM sound signal, or a composite signal obtained by combining the second sound signal with the PCM sound signal. The conversion unit 33 can be realized by a digital analogue converter (DAC) or the like, and the amplification unit 34 can be realized by an amplifier or the like.

Figure 9:
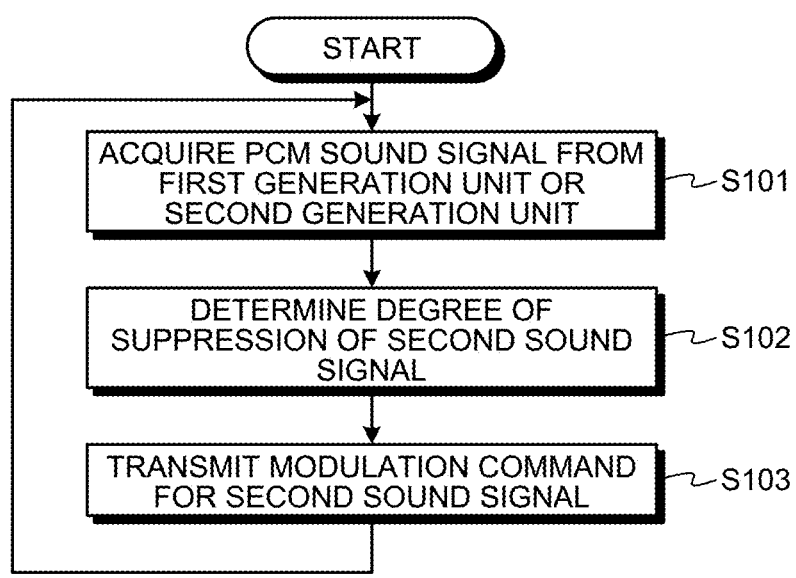
FIG. 9 is a flowchart illustrating an example of a processing procedure by the electronic device according to the embodiment of the present disclosure.

4. Example of Processing Procedure of Electronic Device According to the Embodiment of the Present Disclosure Hereinafter, a processing procedure of the electronic device 1 according to the embodiment of the present disclosure will be described. FIG. 9 is a flowchart illustrating an example of a processing procedure by the electronic device according to the embodiment of the present disclosure. The processing procedure illustrated in FIG. 9 is repeatedly performed while the electronic device 1 is in operation.

As illustrated in FIG. 9, the signal control unit 25 acquires the PCM sound signal from the first generation unit 23 or the second generation unit 24 (step S101).

The signal control unit 25 refers to the signal control data stored in signal control data storage unit 13 to determine the degree of suppression of the output level of the second sound signal (step S102).

The signal control unit 25 transmits a modulation command indicating the determined degree of suppression to the second signal processing unit 22 (step S103), and the process returns to the processing procedure of step S101.

According to the processing procedure illustrated in FIG. 9, when the second sound signal and the PCM sound signal are combined and input to the piezo actuator 4, the signal control unit 25 can modulate the second sound signal so that the vibration of the display 2b in response to the PCM sound signal is prioritized over the vibration of the display 2b in response to the second sound signal. As a result, the vibration of the display 2b according to the PCM sound signal can be clearly perceived by the user, and the object of making the user strongly feel the vibration effect of haptics feedback can be achieved.

5. Others

Figure 10:
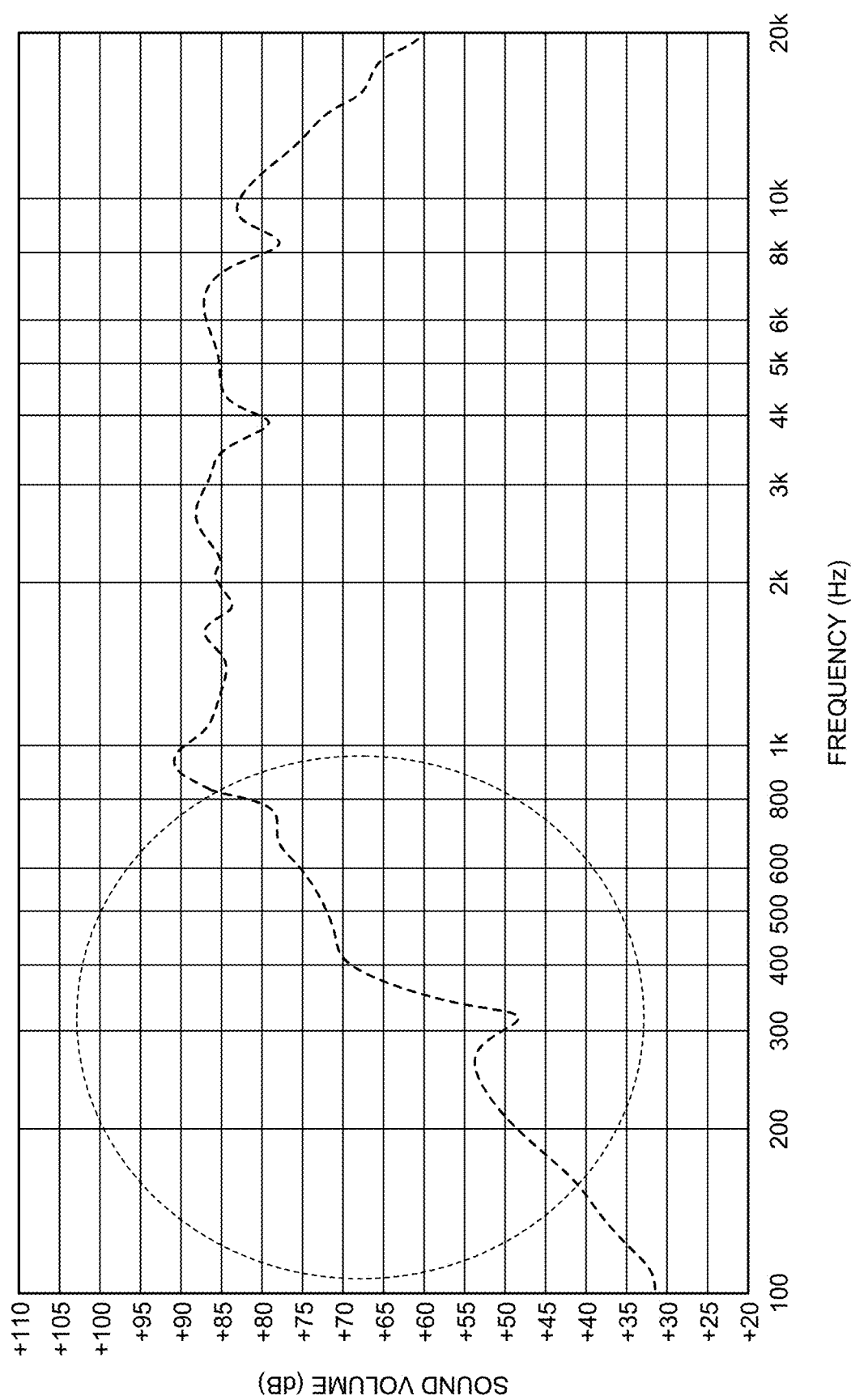
FIG. 10 is a diagram illustrating an example of frequency characteristics of playback sound by an electronic device according to a comparative example.
Figure 11:
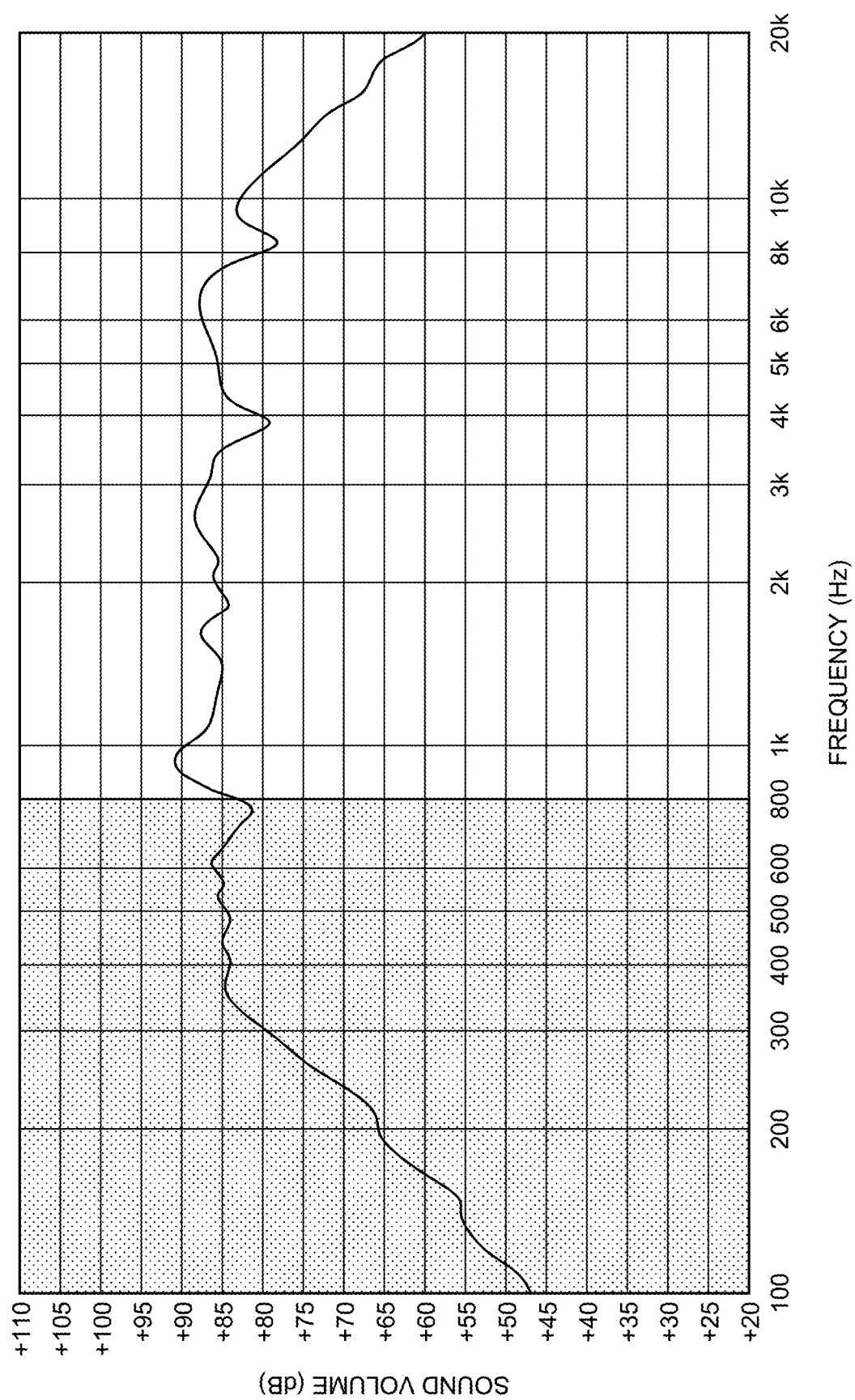
FIG. 11 is a diagram illustrating an example of frequency characteristics of playback sound by the electronic device according to the embodiment of the present disclosure.
Figure 12:
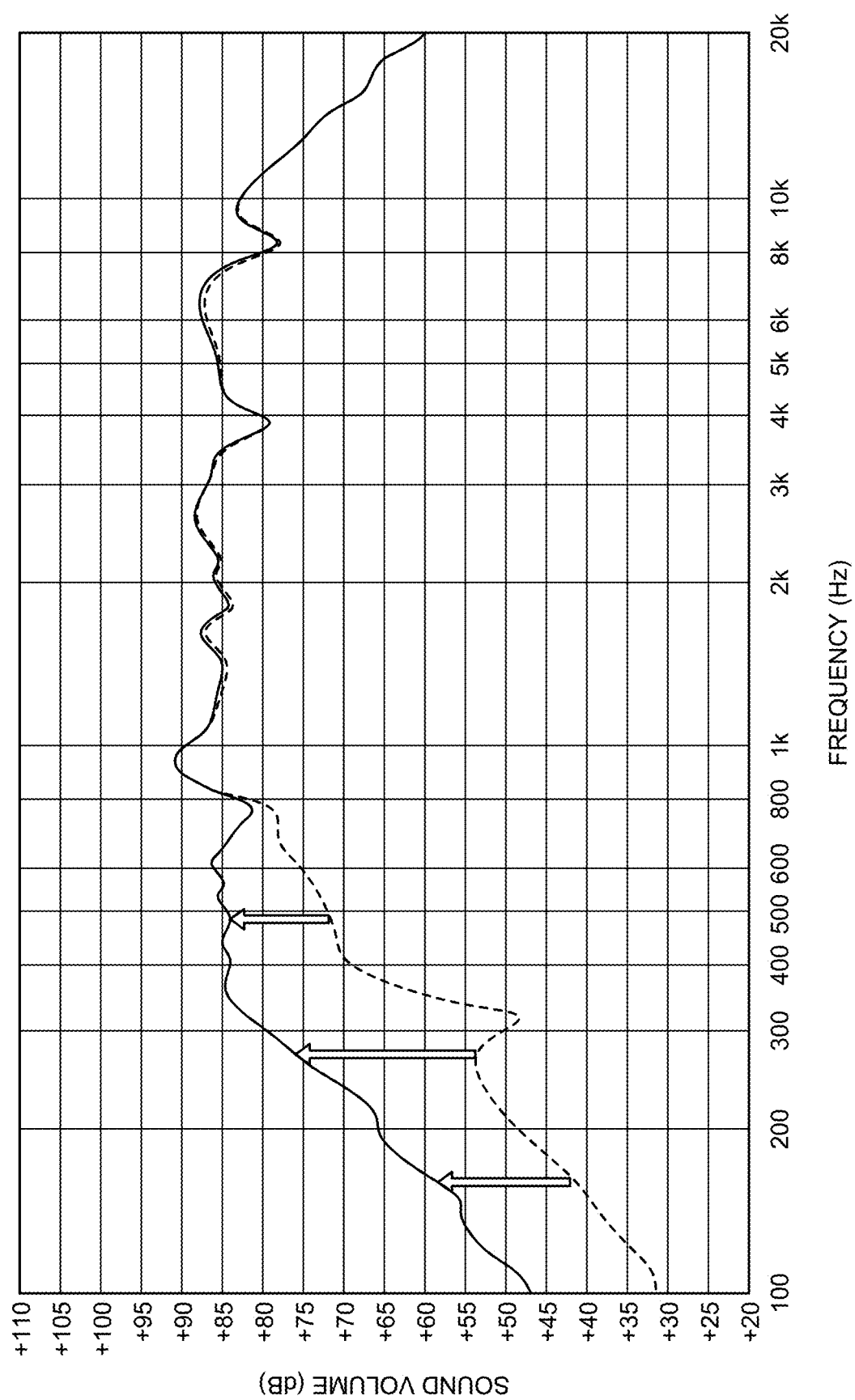
FIG. 12 is a diagram for explaining frequency characteristics of playback sound by the electronic device according to the embodiment of the present disclosure.

5-1. Example of Frequency Characteristics of Playback Signal of the Present Disclosure Hereinafter, a comparison result between a playback sound by the electronic device 1 according to the embodiment of the present disclosure and a playback sound by a conventional electronic device according to a comparative example will be described. FIG. 10 is a diagram illustrating an example of frequency characteristics of the playback sound by an electronic device according to the comparative example. FIG. 11 is a diagram illustrating an example of frequency characteristics of the playback sound by the electronic device according to the embodiment of the present disclosure. FIG. 12 is a diagram for explaining frequency characteristics of the playback sound by the electronic device according to the embodiment of the present disclosure.

As illustrated in FIG. 10, in the sound played back by the electronic device according to the comparative example, the output in the low range of less than 800 Hz (hertz) is weak (sound volume is small). On the other hand, as illustrated in FIG. 11, the output in the low range of less than 800 Hz (hertz) of the playback sound of the electronic device 1 according to the embodiment of the present disclosure is stronger (sound volume is large) than that of the electronic device according to the comparative example. That is, as illustrated in FIG. 12, the playback sound of the electronic device 1 according to the embodiment of the present disclosure can increase the sound volume of each frequency component of less than 800 Hz (hertz) by about 12.5 to 25 dB (decibel), compared with that of the electronic device according to the comparative example.

The piezo actuator 4 included in the electronic device 1 of the present disclosure can cause the display 2b to function as an acoustic device that outputs the sound in the middle and high ranges. However, the speaker 3 to which the output of the sound is allocated can have a sufficient sound volume for the sound in the middle and high ranges. Therefore, the piezo actuator 4 causes the display 2b to function only as an acoustic device that outputs the sound in the low range. In this way, the electronic device 1 according to the embodiment of the present disclosure can raise a prescribed range where it is difficult for a conventional electronic device that requires high-density mounting to obtain a prescribed sound volume, for example, a sound volume in a low range of less than 800 Hz (hertz), so that powerful audio playback can be realized.

Further, as described above with reference to FIGS. 8 and 9 etc., when combining the second sound signal corresponding to the low range with the PCM sound signal based on a predetermined vibration pattern (an example of a control signal for haptics feedback) to input them to the piezo actuator 4, the electronic device 1 performs signal control under which the second sound signal is modulated so that the vibration of the display 2b in response to the PCM sound signal is prioritized over the vibration of the display 2b in response to the second sound signal. As a result, it is possible to make the user clearly perceive the vibration of the display 2b according to the PCM sound signal.

5-2. Hardware Configuration Example

Figure 13:
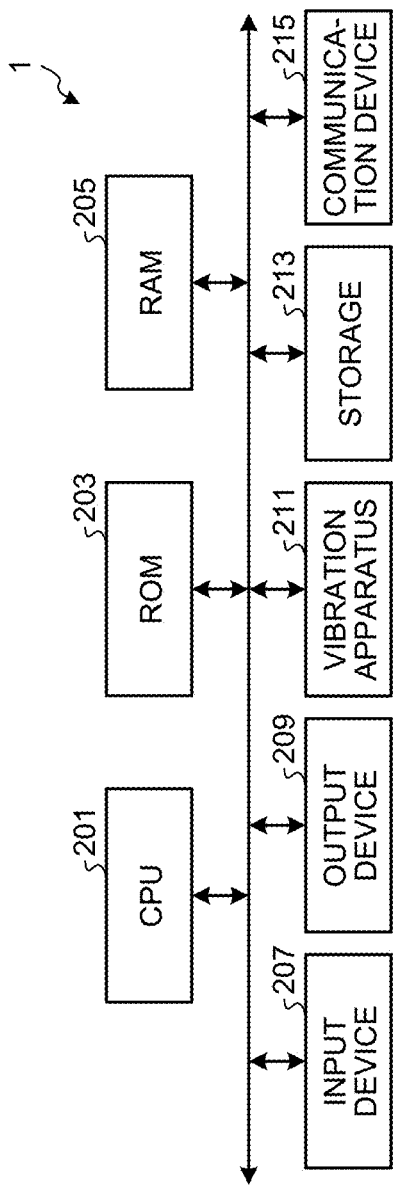
FIG. 13 is a block diagram illustrating a hardware configuration example of the electronic device according to the embodiment of the present disclosure.

Hereinafter, a hardware configuration example of the electronic device 1 according to the embodiment of the present disclosure will be described with reference to FIG. 13. FIG. 13 is a block diagram illustrating a hardware configuration example of the electronic device according to the embodiment of the present disclosure. Information processing by the electronic device 1 according to the embodiment of the present disclosure can be realized by cooperation of software that provides a function for realizing information processing by the electronic device 1 and hardware described below.

The electronic device 1 includes a central processing unit (CPU) 201, a read only memory (ROM) 203, and a random access memory (RAM) 205. In addition, the electronic device 1 includes an input device 207, an output device 209, a vibration apparatus 211, a storage device 213, and a communication device 215.

The CPU 201 functions as an arithmetic processing device and a control device, and controls the overall operation in the electronic device 1 according to various programs. The CPU 201 is an example of a control device mounted on the electronic device 1, and may be another processor such as a micro processing unit (MPU).

The ROM 203 stores programs used by the CPU 201, operation parameters, and the like. The RAM 205 temporarily stores programs used in the execution of the CPU 201, parameters that appropriately change in the execution, and the like. These are connected to each other by a host bus including a CPU bus or the like. The CPU 201, the ROM 203, and the RAM 205 can implement the functions of the respective units (the first signal processing unit 21 to the signal control unit 25) included in the control unit 20 described with reference to FIG. 8 and the like, for example.

The input device 207 includes input means for the user to input information such as buttons, cameras, microphones, sensors, switches, and levers, and an input control circuit that generates an input signal based on input by the user and outputs it to the CPU 201. For example, the touch panel 2a illustrated in FIG. 8 constitutes part of the input device 207.

The output device 209 can be realized by, for example, a display apparatus such as a cathode ray tube (CRT), a liquid crystal display (LCD), or an organic EL display, or an audio output device such as a speaker or a headphone. For example, the display 2b illustrated in FIG. 8 constitutes part of the output device 209.

The vibration apparatus 211 is a device that generates the vibration according to a control signal for haptics feedback from the CPU 201. For example, the piezo actuator 4 illustrated in FIG. 8 constitutes part of the vibration apparatus 211.

The storage device 213 is a device that stores data. The storage device 213 may include a storage medium, a recording device that records data in the storage medium, a reading device that reads data from the storage medium, and a deletion device that deletes the data recorded in the storage medium. Furthermore, the storage device 213 includes, for example, a hard disk drive (HDD), a solid storage drive (SSD), a memory having an equivalent function, or the like. The storage device 213 drives a storage and stores programs executed by the CPU 201 and various pieces of data. For example, the function of the memory unit 10 illustrated in FIG. 8 is realized by the storage device 213.

The communication device 215 is, for example, a communication interface composed of a communication device or the like for connection to the network. Such a communication interface is, for example, a short distance radio communication interface such as Bluetooth (registered trademark) or ZigBee (registered trademark), and a communication interface such as a radio local area network (LAN), Wi-Fi, or mobile communication network. The mobile communication network includes a long term evolution (LTE), 4G, 5G, and the like. Furthermore, the communication device 215 may be a wired communication device that performs wired communication.

6. Conclusion

The electronic device 1 according to the embodiment of the present disclosure includes the display 2b (an example of a vibrating body), the speaker 3, the piezo actuator 4, and the signal control unit 25. The speaker 3 outputs a sound based on the first sound signal corresponding to the middle range and the high range. The piezo actuator 4 is provided on the display 2b and is deformed in response to the second sound signal corresponding to the low range or the PCM sound signal based on a predetermined vibration pattern (an example of a control signal for haptics feedback) to vibrate the display 2b.

As described above, the electronic device 1 having the above-described configuration can allocate the output of the low range sound to the display 2b functioning as the acoustic device. As a result, it is possible to increase the sound volume of a prescribed range, that is, a low range, in which it is difficult to obtain a prescribed sound volume in an electronic device required to be mounted at a high density, and to obtain a desired sound volume. In addition, the electronic device 1 causes the display 2b whose display region tends to expand to function as a vibration apparatus (haptics device). As a result, an existing vibration apparatus such as a vibrator is unnecessary, and a desired vibration intensity can be secured while meeting the demand for high-density mounting.

The electronic device 1 further includes the signal control unit 25 that modulates the second sound signal so that when the signal control unit 25 combines the second sound signal with the PCM sound signal to input them to the piezo actuator 4, the vibration of the display 2b in response to the PCM sound signal is prioritized over the vibration of the display 2b in response to the second sound signal. As a result, when the display 2b is caused to function as an acoustic device, and a vibration apparatus (haptics device), it is possible to prevent the output of tactile feedback and the like to the user due to vibration from being buried in the output of the sound in the low range, and the vibration of the display 2b can be clearly perceived by the user, so that it is possible to make the user strongly feel the vibration effect of haptics feedback.

In addition, the signal control unit 25 suppresses the output level of the second sound signal so that the amplitude of the second sound signal is smaller than the amplitude of the PCM sound signal. As a result, the difference between the vibration corresponding to the sound in the low range and the vibration corresponding to feedback or the like to the user can be increased, and it is possible to make the user clearly perceive tactile feedback and the like to the user, so that it is possible to make the user strongly feel the vibration effect of haptics feedback.

In addition, the signal control unit 25 limits the frequency band of the second sound signal so as to attenuate at least part of the frequency components included in the second sound signal. As a result, the difference between the vibration corresponding to the sound in the low range and the vibration corresponding to feedback or the like to the user can be increased, and it is possible to make the user clearly perceive tactile feedback and the like to the user, so that it is possible to make the user strongly feel the vibration effect of haptics feedback.

Further, the signal control unit 25 suppresses the output level of the second sound signal so that the amplitude of the second sound signal is smaller than the amplitude of the PCM sound signal, and limits the band of the second sound signal so as to attenuate low frequencies of the second sound signal. As a result, the difference between the vibration corresponding to the sound in the low range and the vibration corresponding to the feedback or the like to the user can be increased, so that it is possible to make the user more clearly perceive the tactile feedback to the user.

In addition, the signal control unit 25 makes the playback time of the PCM sound signal longer than the playback time of the second sound signal. This makes it possible to make the user strongly feel the vibration effect of haptics feedback.

Further, in the electronic device 1, the display 2b functions as a vibrating body, and the piezo actuator 4 is provided on the back face $SF_2$, of the display 2b, facing the front face $SF_1$. As a result, it can function as a vibration apparatus without hindering the function of the display 2b as a display apparatus.

The piezo actuator 4 is provided at a position where the vibration of the display 2b is maximized. As a result, the vibration efficiency of the display 2b can be enhanced.

The piezo actuator 4 is provided near the center of the back face $SF_2$ of the display 2b. As a result, the vibration generated by the piezo actuator 4 can be efficiently propagated to the display 2b.

The piezo actuator 4 may be provided on the touch panel 2a. For example, when the touch panel 2a is superimposed on the display 2b, the piezo actuator 4 may be provided on the touch panel 2a instead of the display 2b. This makes it easier for the user to feel the user feedback than when providing the piezo actuator 4 on the display 2b.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

For example, in the above embodiment, the piezo actuator 4 may be divided into a plurality of parts as long as it can cause the display 2b to function as an acoustic device and as a vibration apparatus (haptics device).

For example, in the above embodiment, in the electronic device 1, the piezo actuator 4 may be provided on the touch panel 2a instead of the display 2b. When the touch panel 2a is superimposed on the display 2b, it is more beneficial to provide the piezo actuator 4 on the touch panel 2a rather than on the display 2b in order to make it easier for the user to perceive tactile feedback to the user. When the piezo actuator 4 is provided on the touch panel 2a, it is desirable to provide the piezo actuator 4 at a position where the vibration of the touch panel 2a is maximized.

Furthermore, the effects described in the present specification are merely illustrative or exemplified effects, and are not limitative. That is, the technique according to the present disclosure can accomplish other effects apparent to those skilled in the art from the description of the present specification, in addition to or instead of the effects described above.

Note that the technique of the present disclosure can also have the following configurations as belonging to the technical scope of the present disclosure.

(1)

An electronic device comprising:

a touch panel display;

a speaker that outputs a sound based on a first sound signal corresponding to a range of a prescribed frequency or more; and a piezo actuator that is provided on the touch panel display and that is deformed in response to at least one of a second sound signal corresponding to a range of less than the prescribed frequency and a control signal for haptics feedback based on a predetermined vibration pattern to vibrate the touch panel display.

(2)

The electronic device according to (1), further comprising:

a signal control unit that modulates the second sound signal so that a vibration of the touch panel display based on the control signal is prioritized over a vibration of the touch panel display based on the second sound signal when a composite signal obtained by combining the second sound signal with the control signal is input to the piezo actuator.

(3)

The electronic device according to (2), wherein the signal control unit suppresses an output level of the second sound signal so that an amplitude of the second sound signal is smaller than an amplitude of the control signal.

(4)

The electronic device according to (2), wherein the signal control unit limits a band of the second sound signal so as to attenuate low frequencies of frequency components included in the second sound signal.

(5)

The electronic device according to (2), wherein the signal control unit suppresses an output level of the second sound signal so that an amplitude of the second sound signal is smaller than an amplitude of the control signal, and limits a band of the second sound signal so as to attenuate low frequencies of the second sound signal.

(6)

The electronic device according to (2), wherein the signal control unit makes a playback time of the control signal longer than a playback time of the second sound signal.

(7)

The electronic device according to (1), wherein the piezo actuator is provided on a back face of a display of the touch panel display, the back face facing a display face of the display.

(8)

The electronic device according to (7), wherein the piezo actuator is provided at a position where a vibration of the display is maximized.

(9)

The electronic device according to (7), wherein the piezo actuator is provided near a center of the back face of the display.

REFERENCE SIGNS LIST

1 ELECTRONIC DEVICE
2 TOUCH PANEL DISPLAY
2a TOUCH PANEL
2b DISPLAY
3 SPEAKER
4 PIEZO ACTUATOR
10 MEMORY UNIT
11 FIRST TONE DATA STORAGE UNIT
12 SECOND TONE DATA STORAGE UNIT
13 SIGNAL CONTROL DATA STORAGE UNIT
20 CONTROL UNIT
21 FIRST SIGNAL PROCESSING UNIT
22 SECOND SIGNAL PROCESSING UNIT
23 FIRST GENERATION UNIT
24 SECOND GENERATION UNIT
25 SIGNAL CONTROL UNIT

The invention claimed is:

1. An electronic device, comprising:
a touch panel display;
a speaker that outputs a first sound based on a first sound signal corresponding to a range of a prescribed frequency or more; and
a piezo actuator that is provided on the touch panel display and that vibrates the touch panel display to output a second sound and haptic feedback, wherein
the piezo actuator is deformed in response to a second sound signal, corresponding to a range of less than the prescribed frequency, to vibrate the touch panel display to output the second sound, and
the piezo actuator is deformed in response to a control signal based on a predetermined vibration pattern to vibrate the touch panel display for the haptic feedback.

2. The electronic device according to claim 1, further comprising:
a signal control circuit that modulates the second sound signal so that a vibration of the touch panel display based on the control signal is prioritized over a vibration of the touch panel display based on the second sound signal when a composite signal obtained by combining the second sound signal with the control signal, is input to the piezo actuator.

3. The electronic device according to claim 2, wherein the signal control circuit suppresses an output level of the second sound signal so that an amplitude of the second sound signal is smaller than an amplitude of the control signal.

4. The electronic device according to claim 2, wherein the signal control circuit limits a band of the second sound signal so as to attenuate low frequencies of frequency components included in the second sound signal.

5. The electronic device according to claim 2, wherein the signal control circuit suppresses an output level of the second sound signal so that an amplitude of the second sound signal is smaller than an amplitude of the control signal, and limits a band of the second sound signal so as to attenuate low frequencies of the second sound signal.

6. The electronic device according to claim 2, wherein the signal control circuit makes a playback time of the control signal longer than a playback time of the second sound signal.

7. The electronic device according to claim 1, wherein the piezo actuator is provided on a back face of a display of the touch panel display, the back face facing a display face of the display.

8. The electronic device according to claim 7, wherein the piezo actuator is provided at a position where a vibration of the display is maximized.

9. The electronic device according to claim 7, wherein the piezo actuator is provided near a center of the back face of the display.

10. An electronic device, comprising:
control circuitry configured to
control a speaker to output a first sound based on a first sound signal corresponding to a range of a prescribed frequency or more;
control a piezo actuator, which is provided on a display, to vibrate the display to output a second sound in response to a second sound signal, the second sound signal corresponding to a range of less than the prescribed frequency; and
control the piezo actuator to vibrate the display to output haptic feedback in response to a control signal based on a predetermined vibration pattern.

11. The electronic device according to claim 10, further comprising the speaker.

12. The electronic device according to claim 10, further comprising the piezo actuator.

13. The electronic device according to claim 10, further comprising the display.

14. The electronic device according to claim 10, wherein the control circuitry is further configured to modulate the second sound signal so that a vibration of the touch panel display based on the control signal is prioritized over a vibration of the touch panel display based on the second sound signal when a composite signal obtained by combining the second sound signal with the control signal is input to the piezo actuator.

15. The electronic device according to claim 14, wherein the control circuitry is further configured to suppress an output level of the second sound signal so that an amplitude of the second sound signal is smaller than an amplitude of the control signal.

16. The electronic device according to claim 14, wherein the control circuitry is further configured to limit a band of the second sound signal so as to attenuate low frequencies of frequency components included in the second sound signal.

17. The electronic device according to claim 14, wherein the control circuitry is further configured to suppress an output level of the second sound signal so that an amplitude of the second sound signal is smaller than an amplitude of the control signal, and limits a band of the second sound signal so as to attenuate low frequencies of the second sound signal.

18. The electronic device according to claim 14, wherein the control circuitry is further configured to control a playback time of the control signal to be longer than a playback time of the second sound signal.

* * * * *